United States Patent [19]

Holt

[11] 4,032,163
[45] June 28, 1977

[54] QUICK CHANGE IN-MOTION TOOL CHUCK

[76] Inventor: Donald G. Holt, 508 29th Ave., Oakland, Calif. 94601

[22] Filed: Jan. 26, 1976

[21] Appl. No.: 652,486

[52] U.S. Cl. .................. 279/37; 90/11 A; 279/1 B; 279/118

[51] Int. Cl.² .................. B23B 31/18

[58] Field of Search ............ 279/1 A, 1 B, 1 TS, 279/35, 37, 103, 109, 118; 90/11 A, 11 D

[56] References Cited

UNITED STATES PATENTS

| 214,818 | 4/1879 | Glover | 279/109 |
|---|---|---|---|
| 1,467,992 | 9/1923 | Becker | 279/109 X |
| 1,871,463 | 8/1932 | Olson | 279/51 X |
| 3,599,996 | 8/1971 | Holt | 279/1 B |

Primary Examiner—Othell M. Simpson
Assistant Examiner—Z. R. Bilinsky
Attorney, Agent, or Firm—Harris Zimmerman

[57] ABSTRACT

A tool chuck includes a spindle having a barrel with an axial bore therein, and a collar slidably disposed about the barrel. A diametrical slot within the barrel receives a pair of opposed, pivoting toggles which engage and retain the end of a tool inserted in the barrel bore. The toggles are pivoted by a pair of linking members secured to a cylindrical member disposed in axially translatable fashion in the upper end of the bore. The cylindrical member is translated by the collar by means of an annular slot therein which receives opposed shoulders extending from the cylindrical member through another diametrical slot. Axial translation of the collar releases or secures a tool in the bore while the chuck is rotating at operating speed.

11 Claims, 4 Drawing Figures

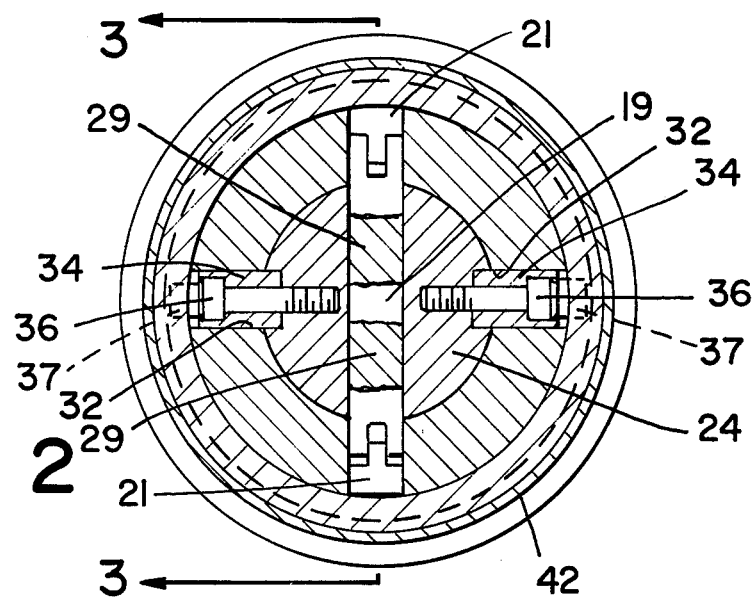
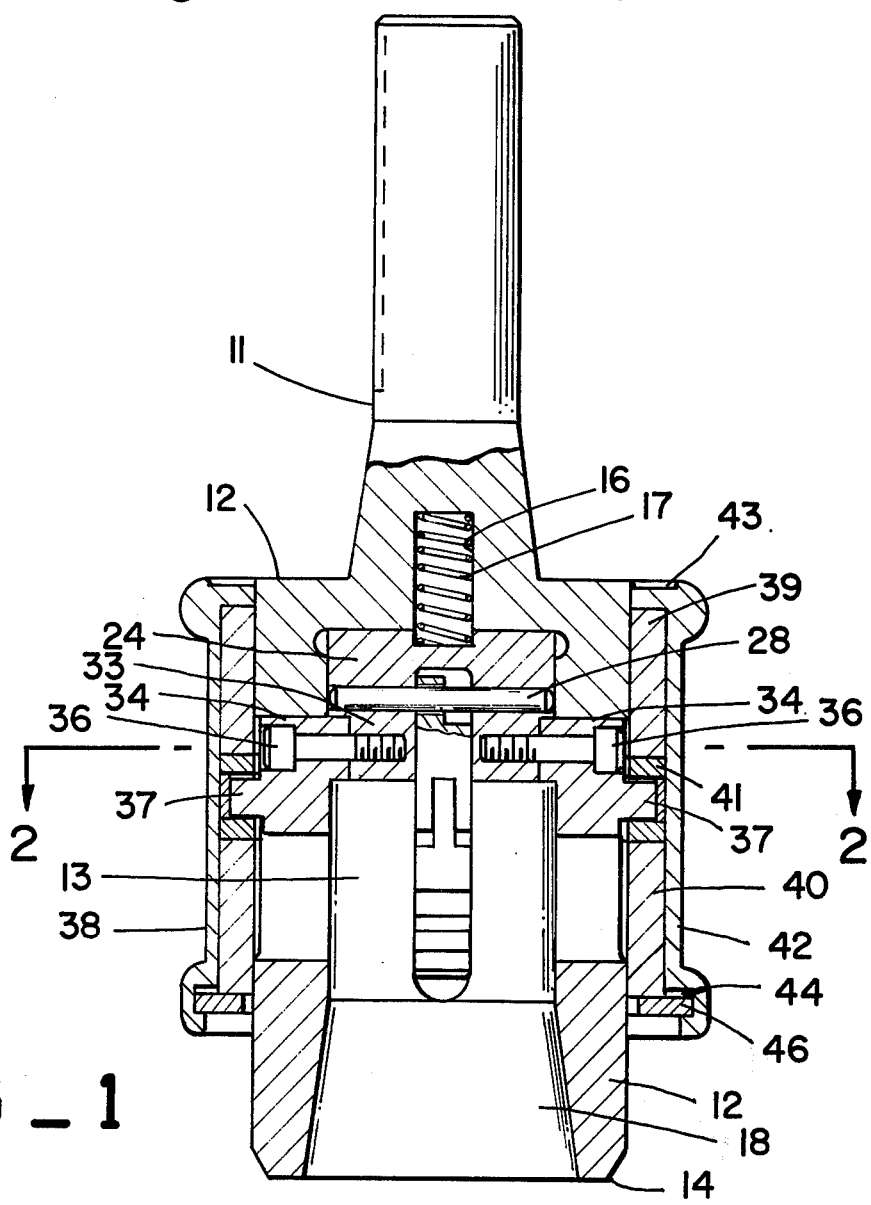
FIG_2
FIG_1

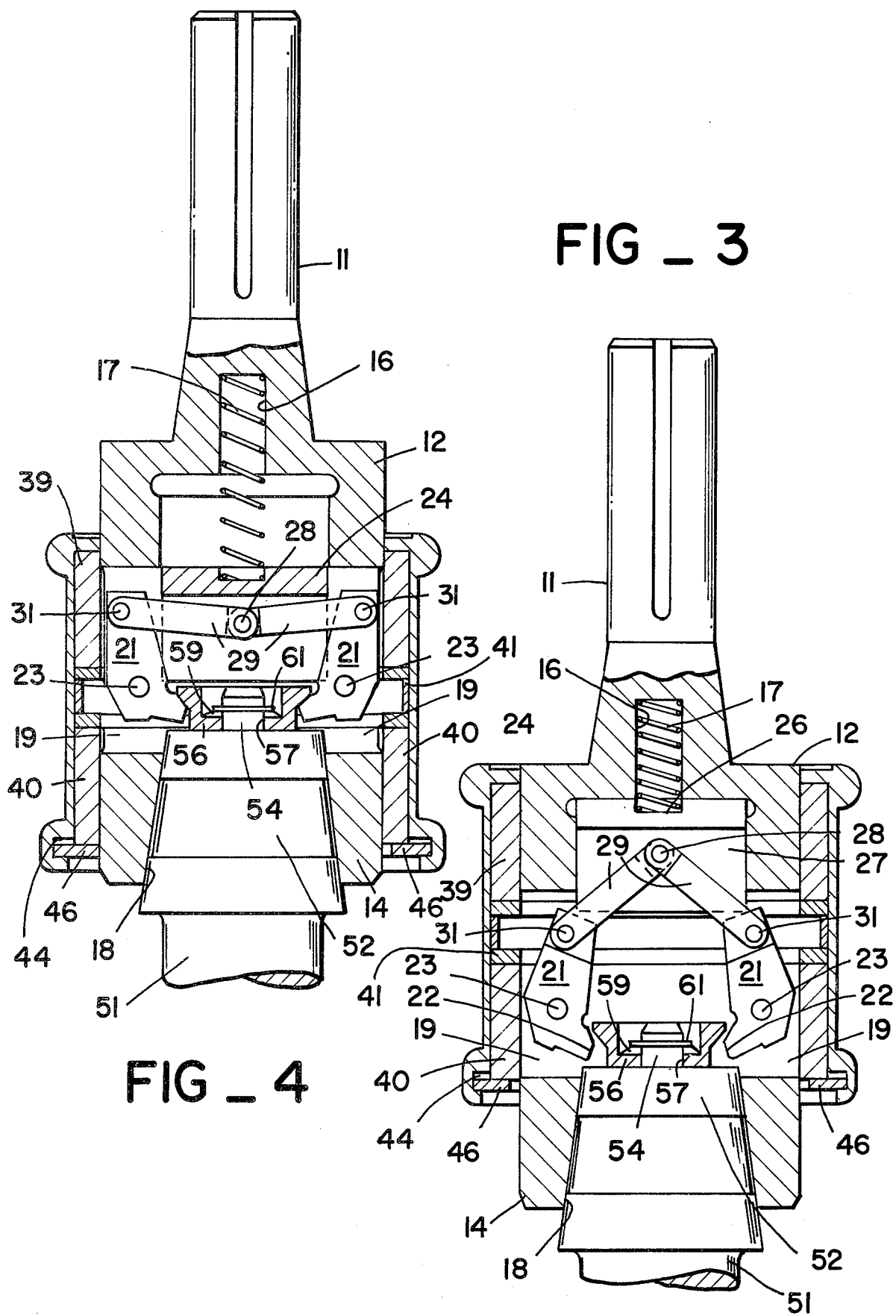

QUICK CHANGE IN-MOTION TOOL CHUCK

BACKGROUND OF THE INVENTION

In machine tools such as boring mills or the like it is often necessary to change the work engaging tool implement, due either to wear of the tool or a required change in machining operation. To facilitate such changes, machine tools are provided with tool implement holders such as chucks or collects. Such holders provide a means for releasably connecting the tool implements with the machine tool in an enforced orientation in which the tool is aligned with the axis of rotation of the spindle through which the toolholder is driven.

There has recently been developed chuck devices which permit changing of the tool without necessitating stopping rotation of the chuck itself. This type of chuck saves both machine time and operator labor, and conserves energy required to start and stop the machine. One such chuck device is described in U.S. Pat. No. 3,599,996, issued to Donald G. Holt on Aug. 17, 1971.

SUMMARY OF THE INVENTION

The present invention generally comprises a tool holding device for machine tools or the like which permits the installation or removal of a work-engaging tool without requiring the stopping of the machine. It comprises a spindle which is secured to the rotating mandrel or output shaft of a machine, and a barrel extending from the spindle. The barrel includes a bore extending axially therein with a tapered distal portion for receiving a tool or toolholder, and a collar is slidably disposed about the barrel.

Disposed within the barrel are a pair of diametrical slots. In one slot a pair of opposed, pivoting toggles are secured. A cylindrical member is axially translatably disposed in the upper end of the bore, and a pair of linking members extend pivotally therefrom to the toggles so that translation of the cylindrical member causes rotation of the toggles. Opposed shoulders extend through the other diametrical slot and engage an annular groove in the interior surface of the collar.

The toggles are provided with detents at the distal ends thereof which are adapted to engage the interior end portion of the tool or toolholder. Sliding the collar toward the distal end of the barrel causes the cylindrical member to translate. It in turn moves the linking members through a past center position as they cause the toggles to pivot. The detents on the toggles thus engage the end of the tool in a self-locking fashion. The past center self-locking feature is enhanced by a compression spring disposed in the upper end of the barrel, impinging on the cylindrical member. A tool may thus be inserted or removed from the present invention merely by means of manual actuation of the collar.

THE DRAWING

FIG. 1 is a longitudinal cross-sectional view of the tool chuck of the present invention.

FIG. 2 is a transverse cross-sectional view of the tool chuck of the present invention, taken along line 2—2 of FIG. 1.

FIG. 3 is a longitudinal cross-sectional view of the tool chuck of the present invention, taken along line 3—3 of FIG. 2, and showing the chuck in the released position.

FIG. 4 is a longitudinal cross-sectional view of the tool chuck as oriented in FIG. 3 and shown in the tool engaging position.

DESCRIPTION OF THE PREFERRED EMBODIMENT

With reference to FIG. 1, the present invention generally comprises a spindle 11 which is adapted to be secured to the rotating mandrel or output shaft of a machining apparatus in coaxial fashion. Extending from the spindle is a generally cylindrical barrel 12, which is provided a substantially cylindrical bore 13 extending coaxially therein from the distal end 14 of the barrel. Disposed at the upper end of the bore is a coaxial cylindrical recess 16, in which is disposed a helical compression spring 17. The lower end 18 of the bore includes a downwardly and outwardly flaring taper which receives and centers tools or toolholders, as will be explained in the following.

As shown in FIG. 3, the barrel is provided with a first pair of diametrically opposed slots 19 which extend longitudinally from the bore to the exterior of the barrel. Pivotally secured in the slots 19 are a pair of opposed toggle members 21. Each toggle member comprises a generally flat, short bar which includes a detent 22 extending therefrom. The toggle members are pivotally secured to the barrel by means of a pair of dowel pins 23 extending through the toggles and press fit in holes in the barrel. The exterior sides of the toggles are configured so that they may pivot about the dowels without extending beyond the circumference of the barrel.

Disposed in the upper end of the bore is a cylindrical member 24 which is diametrically dimensioned to be axially slidable within the bore. The upper transverse face of the member 24 is provided with a coaxial recess 26 which receives one end of the compression spring 17. The member 24 also includes a transverse slot 27 extending diametrically therethrough. A dowel pin 28 is disposed perpendicular to the slot 27, and is received in a hole in the member 24.

Pivotally joined to the dowel pin 28 and disposed within the slot 27 are a pair of linking members 29. The distal ends of the linking members are secured in pivoting fashion to the upper ends of the toggle members by pivot pins 31. As seen in FIG. 1 the linking members and the toggle members are joined in clevis fashion, with pins 31 acting as clevis pins.

The barrel is provided with a second pair of opposed slots 32, shown in FIG. 1, which are disposed diametrically in a plane perpendicular to the plane of slots 19. The cylindrical member includes a reduced diameter annulus 33, and an opposed pair of blocks 34 are disposed within the slots 32 and secured to the annulus 33 by means of socket head cap screws 36. As shown in FIGS. 1 and 2, the blocks 34 include a pair of opposed detents 37 extending radially outwardly therefrom.

With reference to FIGS. 1, 3 and 4, there is disposed concentrically about the barrel 12 an actuator collar 38. The actuator includes a pair of axially spaced cylinders 39 and 40, which are slideably disposed about the barrel, and an annular channel member 41 intermediate to the cylinders. Secured about the cylinders and the annular channel is a sleeve 42. The sleeve includes an inwardly directed flange 43 at one end thereof which impinges on the upper end of the cylinder 39. At the other end the sleeve is formed to include an annular groove 44 which is adapted to receive a snap ring 46 secured about the barrel, also in slidable fashion. The flange 43 and the snap ring 46 maintain the axial integrity of the actuator assembly, and the engagement of the snap ring in the annular groove acts to secure the sleeve about the members 39, 40, and 41.

Extending into the cavity of the annular channel 41 and freely received therein are the detents 37. It should be noted that the actuator is free to rotate or translate on the barrel. Through the engagement of the detents 37 in the channel 41, translation of the actuator causes equal translation of the cylindrical member 24. With the cylindrical member at the upper end of the bore and the actuator at the upper end of the barrel (toward the spindle) the toggle members are disposed so that the detents thereof are out of engagement of a tool.

As the actuator is translated toward the end 14 of the barrel the cylindrical member 24 is similarly translated. The linking members 29 are pivoted and displace the upper ends of the toggle members outwardly. The detents 22 are thus forced to engage the end of a tool. The dowel pin 28 translates through the center position of the arc of the linking members, as shown in FIG. 4, so that the toggles are locked in the engagement position. Thus the toggles cannot loosen of their own accord, but must be released by manual translation of the actuator. It should be noted that the spring 17 biases the assembly toward the end 14 of their barrel, thus further enhancing the self-locking nature of the toggles and linking members.

The tool or toolholder 51 is provided with an upper end 52 which is tapered equally as the flare of the bore 18. This taper is within one-half degree of arc of being a self-locking taper, so that a minimum amount of axial force is required to secure the tool rigidly in the bore.

Extending axially from the upper face of the tool end 52 is a cylindrical post 54, which is provided with an annular snap ring groove. A ring 56 includes an axial hole 57 communicating with a counterbore 58. The post 54 is slidably received through the hole 57 with a spring-like washer 59 disposed in the counterbore about the post. A snap ring 61, secured to the post, joins the washer and ring 56 to the post.

As shown in FIGS. 3 and 4, the detents 22 actually engage the ring 56 of the tool. The pulling force of the toggles, a matter of several hundred pounds, causes the washer 59 to flex and transmit the force resiliently to the tool. This resilient engagement permits a greater freedom in clearances of the detents and the ring, and the tapered end 52 in the bore 18, so that the toggles are not broken or the tool jammed in the bore. Also, the clearance of the post in the hole 57 permits the toggles to be slightly diametrically off center without misaligning the tool.

The tool chuck of the present invention is normally disposed as shown in FIG. 4, due to the spring 17. To change a tool while the machine is rotating the actuator is grasped manually and translated toward the spindle 11. After the detents clear the ring 56 the tool may be removed, and a new one inserted in the bore. The collar is then manually translated toward the end 14 of the barrel, and the detents grasp the ring 56 of the new tool. The pull of the detents on the ring is sufficient to center the tool in the bore and to provide a frictional engagement therebetween which transmits a great amount of torque with no slippage.

I claim:

1. A tool chuck system for securing and removing a tool in a rotary machine during rotation thereof comprises a spindle adapted to be secured to the rotary machine, a barrel extending axially from said spindle, said barrel including a bore extending axially therein from the distal end thereof; an actuator member disposed about said barrel and slidably translatable thereon; a cylindrical member slidably disposed in the inner end of said bore; a first pair of opposed, diametrical slots disposed within said barrel; a pair of toggle members, each of said toggle members pivotally disposed in one of said first pair of slots; a pair of linking members, each of said linking members pivotally joined at one end to said cylindrical member and pivotally joined at the other end to one end of one said toggle members, said linking members being rotatable through a position perpendicular to said axis of said barrel to form a past center linking arrangement with said toggle members, and means for joining said cylindrical member and said actuator member in axially slidable engagement.

2. The tool chuck system of claim 1, wherein said means includes at least one additional slot disposed in said barrel and extending therethrough from said bore to the exterior of said barrel.

3. The tool chuck system of claim 2, wherein said means includes a detent secured to said cylindrical member and extending through said additional slot.

4. The tool chuck system of claim 3, wherein said actuator includes an annular groove in the interior surface thereof for engaging said detent in axially slidable engagement.

5. The tool chuck system of claim 2, wherein said at least one additional slot extends diametrically through said barrel and axially therealong.

6. The tool chuck system of claim 1, further including a recess in the inner end of said bore, and a compression spring disposed within said recess and impinging on said cylindrical member.

7. The tool chuck system of claim 1, wherein said cylindrical member includes an end slot in one end thereof for receiving said one end of each of said linking members, and a pivot pin extending through said end slot and said linking members.

8. The tool chuck system of claim 1, wherein the other end of each toggle member includes a detent portion for engaging a portion of a work-engaging tool.

9. The tool chuck system of claim 8 wherein said portion of said work-engaging tool includes a protrusion from the chuck-engaging end of said tool.

10. The tool chuck system of claim 9, wherein said protrusion includes a post extending from said tool, and a ring slidably secured about said post by axially resilient means.

11. The tool chuck system of claim 10, wherein said resilient means includes a spring-like washer and a snap ring.

* * * * *